(12) United States Patent
Neumann et al.

(10) Patent No.: US 10,107,256 B2
(45) Date of Patent: Oct. 23, 2018

(54) SYSTEM FOR CENTERING WYE RING IN-SITU

(71) Applicant: General Electric Company, Schenectady, NY (US)

(72) Inventors: Ulrich Werner Neumann, Simpsonville, SC (US); Mark Randall Stewart, Abilene, TX (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 492 days.

(21) Appl. No.: 15/014,775

(22) Filed: Feb. 3, 2016

(65) Prior Publication Data

US 2016/0153423 A1 Jun. 2, 2016

Related U.S. Application Data

(63) Continuation-in-part of application No. 14/018,736, filed on Sep. 5, 2013, now Pat. No. 9,334,850.

(51) Int. Cl.
| | |
|---|---|
| *H02K 15/16* | (2006.01) |
| *F03D 1/00* | (2006.01) |
| *H02K 15/00* | (2006.01) |
| *H02K 3/51* | (2006.01) |
| *F03D 80/50* | (2016.01) |
| *H02K 7/18* | (2006.01) |

(52) U.S. Cl.
CPC .............. *F03D 1/003* (2013.01); *F03D 80/50* (2016.05); *H02K 3/51* (2013.01); *H02K 15/0006* (2013.01); *H02K 15/165* (2013.01); *H02K 7/1838* (2013.01); *Y02E 10/725* (2013.01); *Y10T 29/49009* (2015.01); *Y10T 29/53143* (2015.01)

(58) Field of Classification Search
CPC ...... B23P 6/00; F03D 1/003; Y10T 29/53143; Y10T 29/49009; Y10T 29/49718; H02K 3/51; H02K 15/0006; H02K 15/165
USPC ..................... 29/596, 732, 402.01
See application file for complete search history.

(56) References Cited

U.S. PATENT DOCUMENTS

| | | | |
|---|---|---|---|
| 3,059,162 A | 10/1962 | Humphrey | |
| 3,916,495 A | 11/1975 | Klassen et al. | |
| 4,152,822 A | 5/1979 | Duff | |
| 4,220,870 A | 9/1980 | Kelly | |
| 4,457,677 A * | 7/1984 | Todd | F04C 2/105 |
| | | | 417/310 |
| 5,140,740 A | 8/1992 | Weigelt | |
| 5,140,856 A | 8/1992 | Larsen | |
| 5,163,335 A * | 11/1992 | Isom | F02N 15/006 |
| | | | 123/195 A |
| 5,508,571 A * | 4/1996 | Shafer, Jr. | H02K 3/28 |
| | | | 310/179 |
| 5,724,271 A | 3/1998 | Bankert et al. | |

(Continued)

*Primary Examiner* — Peter DungBa Vo
*Assistant Examiner* — Kaying Kue
(74) *Attorney, Agent, or Firm* — James W. Pemrick; GE Global Patent Operation

(57) ABSTRACT

A wye ring centering system is provided. The system includes a plurality of rollers configured for contacting a wye ring, and a plurality of mounting fasteners configured for supporting the plurality of rollers. Each of the mounting fasteners is configured to pass through a fan hub. The plurality of rollers and the plurality of mounting fasteners are distributed at substantially equal intervals around the fan hub. The wye ring is placed over the plurality of rollers to center the wye ring around a shaft.

19 Claims, 19 Drawing Sheets

(56) References Cited

U.S. PATENT DOCUMENTS

| | | | |
|---|---|---|---|
| 6,941,639 B2 | 9/2005 | Zhang et al. | |
| 7,765,923 B1 * | 8/2010 | Leyva | B25B 27/0035 |
| | | | 100/247 |
| 7,884,492 B2 | 2/2011 | Kiong et al. | |
| 8,067,847 B1 | 11/2011 | Waszak et al. | |
| 9,083,220 B2 * | 7/2015 | Neumann | H02K 15/0081 |
| 9,093,886 B2 * | 7/2015 | Neumann | F03D 1/065 |
| 9,143,022 B2 * | 9/2015 | Neumann | H02K 15/0006 |
| 2009/0235516 A1 | 9/2009 | Notarange et al. | |
| 2011/0133459 A1 | 6/2011 | Fischer | |
| 2012/0073118 A1 | 3/2012 | Bywaters et al. | |
| 2012/0258834 A1 | 10/2012 | Winiasz et al. | |

\* cited by examiner

US 10,107,256 B2

SYSTEM FOR CENTERING WYE RING IN-SITU

CROSS-REFERENCE TO RELATED PATENT APPLICATIONS

This application is a continuation-in-part of application Ser. No. 14/018,736 filed Sep. 5, 2015 and titled "System And Method For Centering Wye Ring In-Situ", which is incorporated by reference herein.

BACKGROUND OF THE INVENTION

The system described herein relates generally to generator repair. More specifically, the system relates to repairing a wind turbine generator in-situ.

At least some known wind turbines include machines for converting variable speed mechanical input from blades of the wind turbine into electric power that is compliant with an electrical grid. For example, some known wind turbines include a doubly fed induction generator (DFIG) for converting the variable speed mechanical input.

Some known DFIG generator rotors have a floating neutral point. This is frequently provided by a wye ring. The wye ring is typically made from a copper bar and is located at the non-drive end (NDE) of the generator. Due to operational stresses which fatigue the brazed connection between the wye ring and its rotor connection points (or terminal lugs), cracks can develop which lead to discontinuity. When the first crack occurs, the generator continues to function satisfactorily since the current can still reach all three rotor connection points. However, if a second crack occurs in the wye ring, at least one part (e.g., one phase) of the rotor windings are now disconnected from the floating neutral. This results in severe arcing across one of the cracks, and leads to failure of the insulation around the wye ring. Eventually, cross-over arcing occurs between the wye ring and the phase lead. The wind turbine monitoring system detects this cross-over arcing condition and recognizes it as a phase fault, and accordingly shuts the wind turbine down.

In the past, the only way to repair a cracked wye ring was to replace the entire generator. To accomplish this repair, a crane capable of lifting heavy loads (e.g., 10 metric tons) to great heights (e.g., 80 meters-100 meters) is required. Cranes of this type are expensive and the generator replacement operation is costly and time consuming. In addition, the wind turbine must be out of service until the new generator is installed.

BRIEF DESCRIPTION OF THE INVENTION

In an aspect of the present invention, a wye ring centering system includes a plurality of rollers configured for contacting a wye ring, and a plurality of mounting fasteners configured for supporting the plurality of rollers. Each of the mounting fasteners is configured to pass through a fan hub. The plurality of rollers and the plurality of mounting fasteners are distributed at substantially equal intervals around the fan hub. The wye ring is placed over the plurality of rollers to center the wye ring around a shaft.

In another aspect of the present invention, a wye ring centering system is provided for a rotor of a generator located in a wind turbine. The system includes a plurality of rollers configured for contacting a wye ring, and a plurality of mounting fasteners configured for supporting the plurality of rollers. Each of the mounting fasteners is configured to pass through a fan hub. A replacement wye ring is configured to replace an existing wye ring serving as a floating neutral connection in the rotor, wherein the replacement wye ring is positioned radially inside the existing wye ring and co-axial with the rotor. A fastening system is configured for mechanically and electrically connecting the replacement wye ring to a plurality of connection lugs, and the plurality of connection lugs are electrically connected to the rotor windings. The plurality of rollers and the plurality of mounting fasteners are distributed at substantially equal intervals around the fan hub, and the wye ring is placed over the plurality of rollers to center the wye ring around a shaft. The replacement wye ring replaces the floating neutral connection of the existing wye ring.

In yet another aspect of the present invention, a wye ring centering system for a rotor of a generator located in a wind turbine is provided. The system includes a plurality of rollers configured for contacting a wye ring, a plurality of mounting fasteners configured for supporting the plurality of rollers, each of the mounting fasteners configured to pass through a fan hub, and a replacement wye ring configured to replace an existing wye ring serving as a floating neutral connection in the rotor, wherein the replacement wye ring is positioned radially inside the existing wye ring and co-axial with the rotor. A fastening system is configured for mechanically and electrically connecting the replacement wye ring to a plurality of connection lugs, the plurality of connection lugs electrically connected to the rotor windings. The plurality of rollers and the plurality of mounting fasteners are distributed at substantially equal intervals around the fan hub, and the wye ring is placed over the plurality of rollers to center the wye ring around a shaft, wherein the replacement wye ring replaces the floating neutral connection of the existing wye ring, and the wye ring centering system is installed on the generator in-situ, and the generator is located in a nacelle of the wind turbine.

DETAILED DESCRIPTION OF THE INVENTION

One or more specific aspects/embodiments of the present invention will be described below. In an effort to provide a concise description of these aspects/embodiments, all features of an actual implementation may not be described in the specification. It should be appreciated that in the development of any such actual implementation, as in any engineering or design project, numerous implementation-specific decisions must be made to achieve the developers' specific goals, such as compliance with machine-related, system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "one aspect" or "an embodiment" or "an aspect" of the present invention are not intended to be interpreted as excluding the existence of additional embodiments or aspects that also incorporate the recited features.

Figure 1:
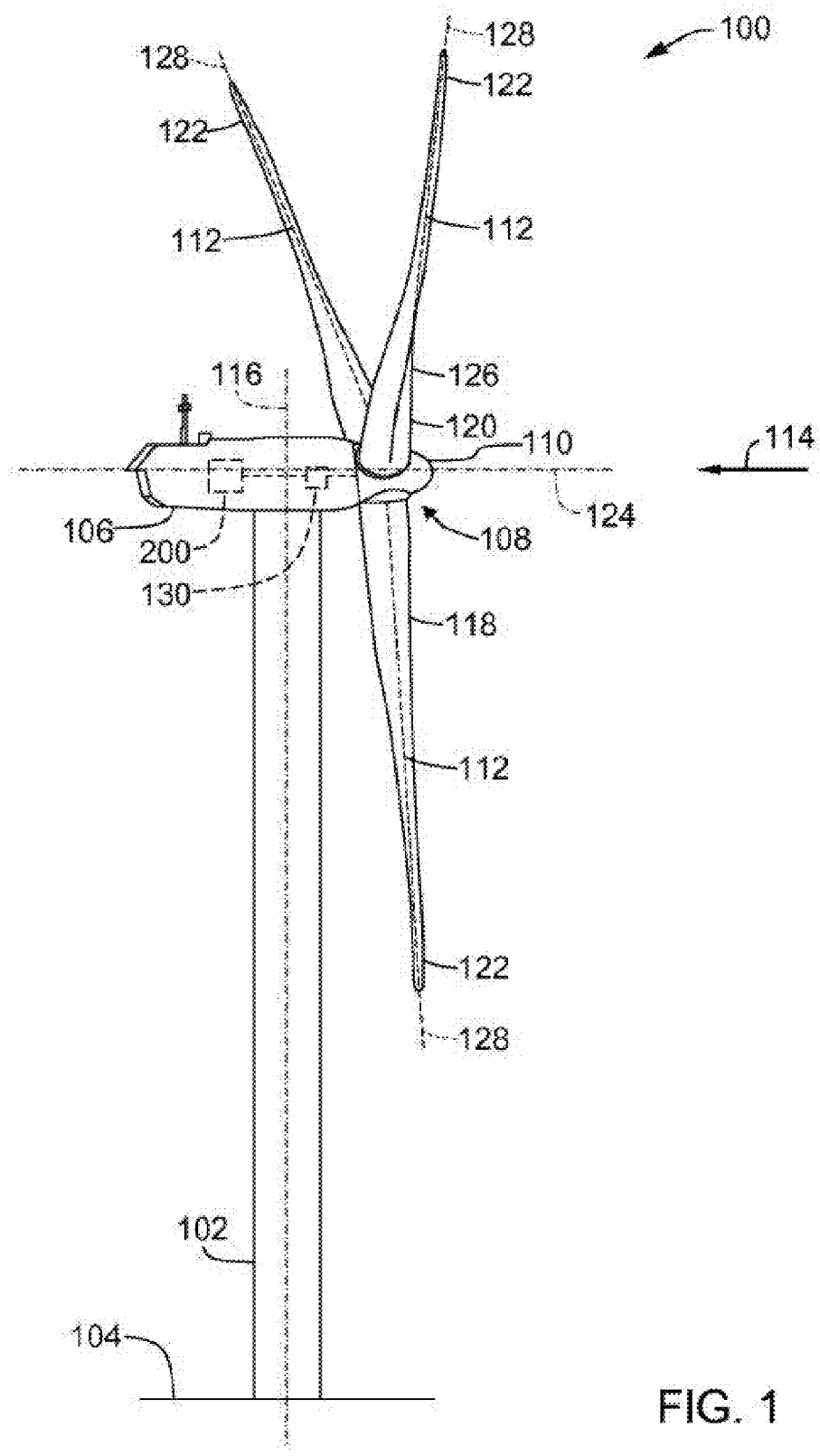
FIG. 1 is a perspective view of an exemplary wind turbine.

FIG. 1 is a schematic view of an exemplary wind turbine 100. In the exemplary embodiment, wind turbine 100 is a horizontal-axis wind turbine. Alternatively, wind turbine 100 may be a vertical-axis wind turbine. In the exemplary embodiment, wind turbine 100 includes a tower 102 extending from and coupled to a supporting surface 104. Tower 102 may be coupled to surface 104 with anchor bolts or via a foundation mounting piece (neither shown), for example. A nacelle 106 is coupled to tower 102, and a main shaft assembly 108 is coupled to nacelle 106. Main shaft assembly 108 includes a rotatable hub 110 and a plurality of rotor blades 112 coupled to hub 110. In the exemplary embodiment, main shaft assembly 108 includes three rotor blades 112. Alternatively, main shaft assembly 108 may have any suitable number of rotor blades 112 that enables wind turbine 100 to function as described herein. Tower 102 may have any suitable height and/or construction that enables wind turbine 100 to function as described herein.

Rotor blades 112 are spaced about hub 110 to facilitate rotating main shaft assembly 108, thereby transferring kinetic energy from wind 114 into usable mechanical energy, and subsequently, electrical energy. Main shaft assembly 108 and nacelle 106 are rotated about tower 102 on a yaw axis 116 to control a perspective of rotor blades 112 with respect to a direction of wind 114. Rotor blades 112 are mated to hub 110 by coupling a rotor blade root portion 118 to hub 110 at a plurality of load transfer regions 120. Load transfer regions 120 each have a hub load transfer region and a rotor blade load transfer region (both not shown in FIG. 1). Loads induced to rotor blades 112 are transferred to hub 110 via load transfer regions 120. Each rotor blade 112 also includes a rotor blade tip portion 122.

In the exemplary embodiment, rotor blades 112 have a length of between approximately 30 meters (m) (99 feet (ft)) and approximately 120 m (394 ft). Alternatively, rotor blades 112 may have any suitable length that enables wind turbine 100 to function as described herein. For example, rotor blades 112 may have a suitable length less than 30 m or greater than 120 m. As wind 114 contacts rotor blade 112, lift forces are induced to rotor blade 112 and rotation of main shaft assembly 108 about an axis of rotation 124 is induced as rotor blade tip portion 122 is accelerated.

A pitch angle (not shown) of rotor blades 112, i.e., an angle that determines the perspective of rotor blade 112 with respect to the direction of wind 114, may be changed by a pitch assembly (not shown in FIG. 1). More specifically, increasing a pitch angle of rotor blade 112 decreases an amount of rotor blade surface area 126 exposed to wind 114 and, conversely, decreasing a pitch angle of rotor blade 112 increases an amount of rotor blade surface area 126 exposed to wind 114. The pitch angles of rotor blades 112 are adjusted about a pitch axis 128 at each rotor blade 112. In the exemplary embodiment, the pitch angles of rotor blades 112 are controlled individually. Further, wind turbine 100 includes a main gearbox 130 and a generator 200 within nacelle 106. In the exemplary embodiment, main shaft assembly 108 includes a low-speed shaft (not shown in FIG. 1) that extends into main gearbox 130 and a high-speed shaft (not shown in FIG. 1) extends to generator 200.

Figure 2:
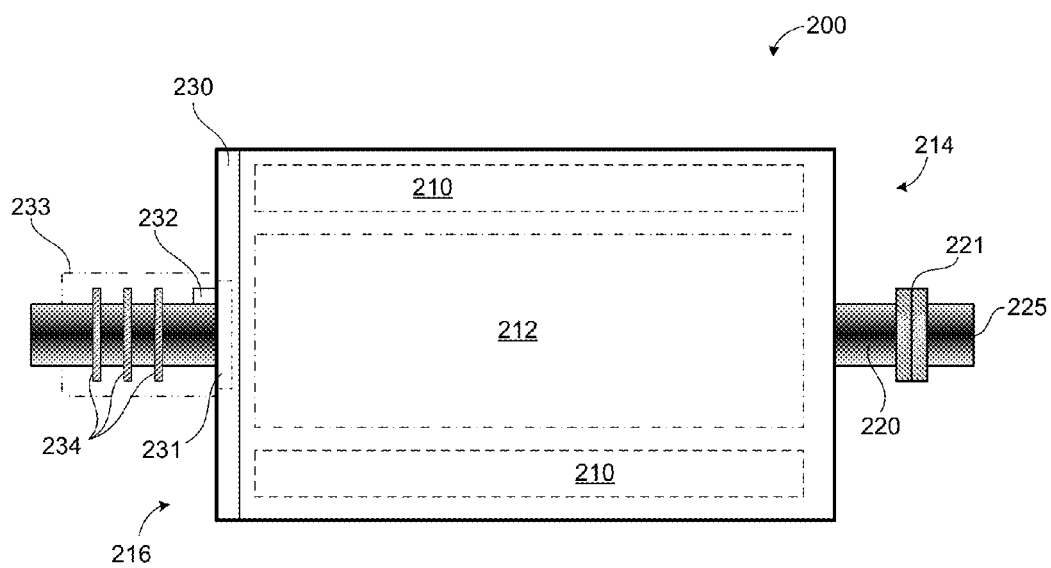
FIG. 2 illustrates a schematic view of a known generator.

FIG. 2 illustrates a schematic view of generator 200. Generator 200 includes a stator 210 and rotor 212. The generator input shaft 220 is coupled to the gearbox output shaft 225 via a coupling 221. Typically, coupling 221 is a bolted flange configuration. The generator input shaft 220 is located at the drive end (DE) 214 of the generator. The opposing end of the generator 200 is the non-drive end (NDE) 216. The non-drive end 216 includes a bearing shield 230. The bearing shield 230 may also include an inner bearing cover 231, and the outside of the bearing shield 230 may be configured for attachment of an oil slinger 232, and a slip ring housing 233 containing slip rings 234.

Figure 3:
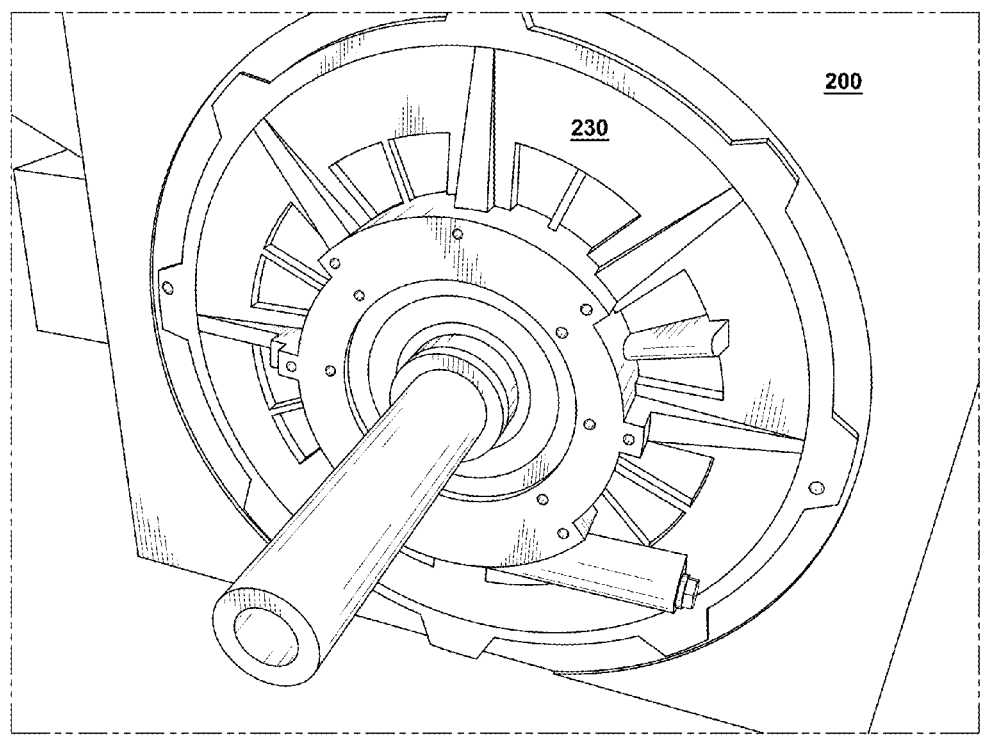
FIG. 3 illustrates a perspective view of the non-drive end of a generator.

FIG. 3 illustrates a perspective view of the non-drive end 216 of generator 200. The bearing shield 230 is shown attached to the generator 200, however the slip ring housing 233, slip rings 234 and other parts have been removed. It can be seen that the existing bearing shield is a solid cover (except for the portion that the rotor shaft passes through).

Figure 4:
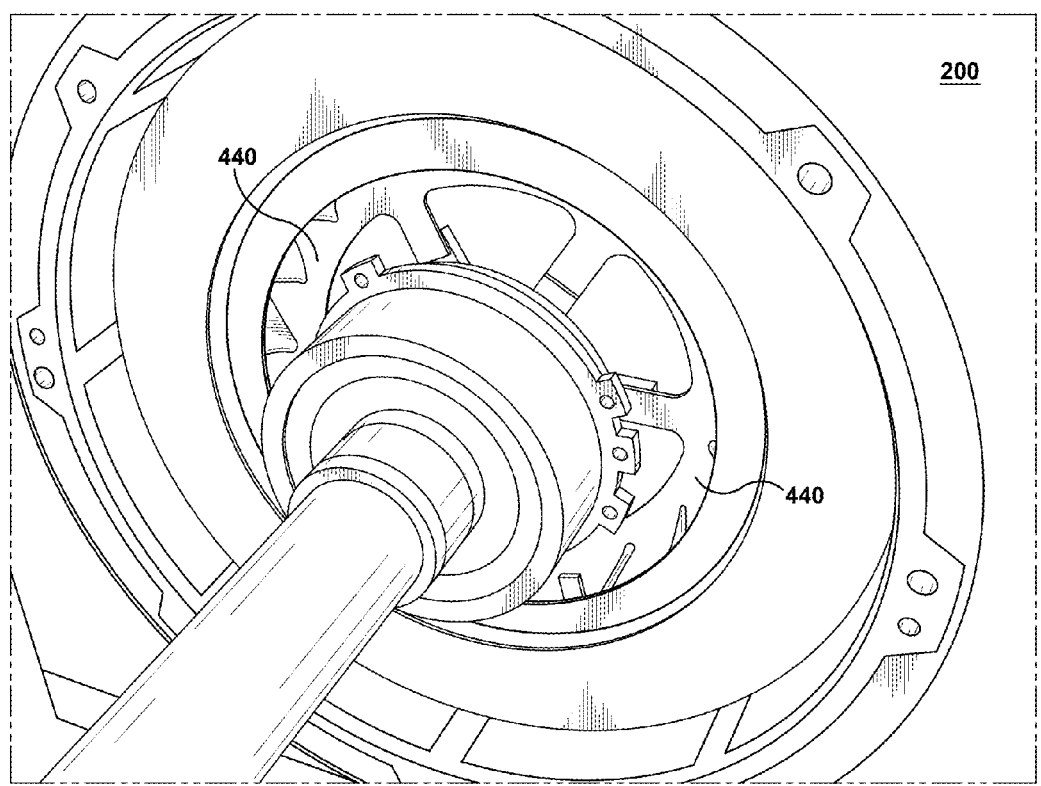
FIG. 4 illustrates a perspective view of the non-drive end a generator with the bearing shield removed.

FIG. 4 illustrates a perspective view of the non-drive end 216 of generator 200 with the bearing shield 230 removed.

A generator rotor fan 440 is attached to the rotor and is configured as a radial flow fan. However, the rotor fan 440 could also be an axial flow type fan as well. Access to the rotor fan is important during a rebalancing operation, as will be described in more detail hereinafter.

Figure 5:
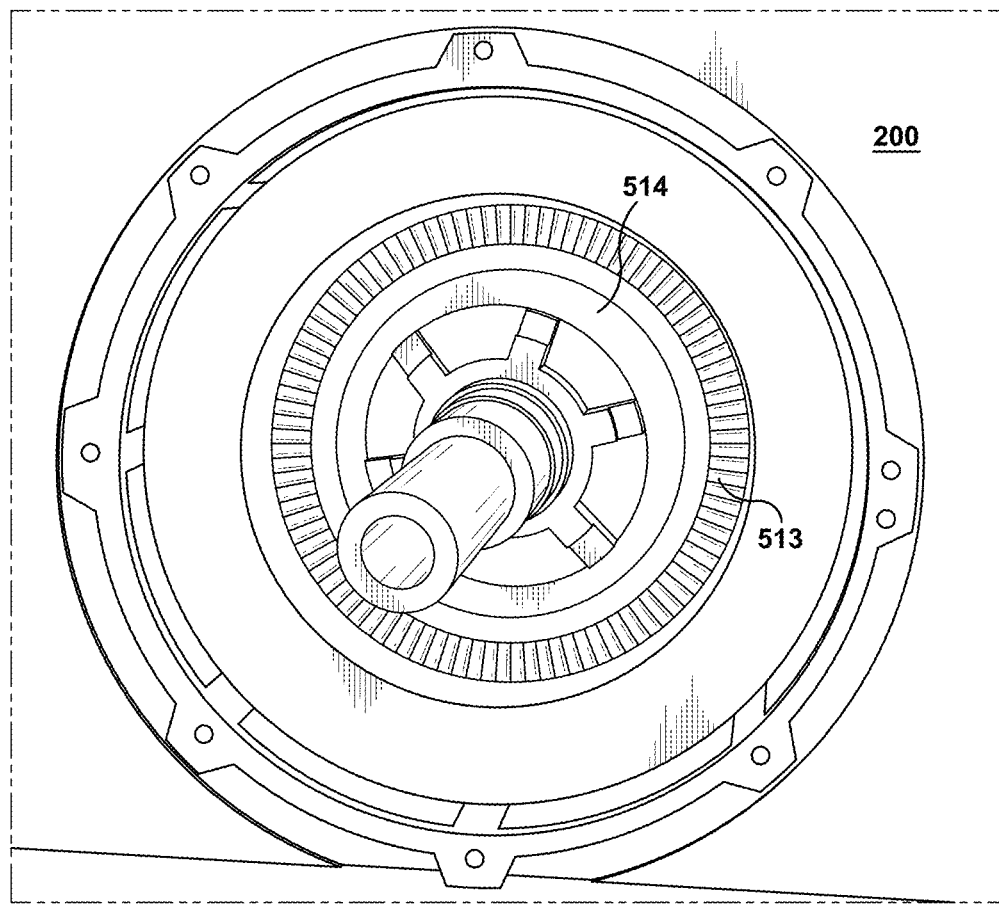
FIG. 5 illustrates a perspective view of the non-drive end of a generator with the rotor fan removed.

FIG. 5 illustrates a perspective view of the non-drive end 216 of generator 200 with the rotor fan 440 removed. The rotor's end windings 513 extend circumferentially around the rotor. The end-windings 513 are connected to a wye-ring 514 that is fit radially inside the end windings 513. The wye ring 514 is typically one or more copper bars curved into a generally circular shape, and the wye ring 514 provides a floating neutral connection for the (typically) three phases of the rotor windings. The wye-ring 514 is normally insulated by wrapping and/or encapsulating in dielectric material.

Figure 6:
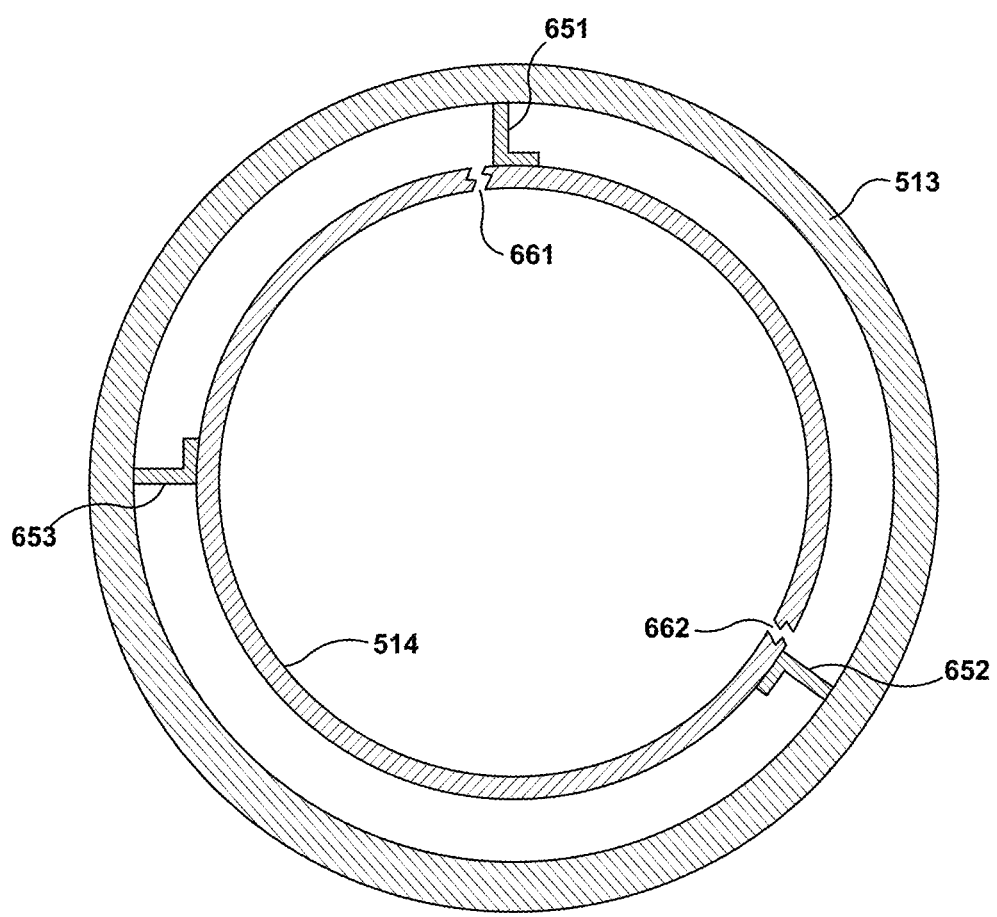
FIG. 6 illustrates a schematic view of the rotor end windings connected to the wye ring.

As stated previously, operational wear and tear can cause cracks in the wye-ring 514. If two or more cracks develop, the generator malfunctions and must be shut down. FIG. 6 illustrates a schematic view of the rotor end windings 513 connected to the wye ring 514. Connection lugs 651, 652 and 653 are used to electrically connect the wye ring 514 to the end windings 513. Typically, the connection lugs are brazed to the wye ring 514 as both are made of copper. The brazed joint experiences strain during operation of the generator. For example, thermal expansion and contraction may not be uniform between the rotor end windings 513 and the wye ring 514, and this uneven expansion and contraction stresses the brazed joint as well as the wye ring itself. Unfortunately, after an extended period of time a crack 661 may form in the wye ring near connection lug 651. A single crack is not catastrophic, as current can still flow to the nearby connection point. However, crack 661 does impose additional loads on the other two connection lugs 652 and 653. If a second crack 662 develops near connection lug 662, one of the phases (via connection lug 651) is now isolated from the floating neutral. Arcing between the cracks will degrade the insulation and will trigger machine faults.

Figure 7:
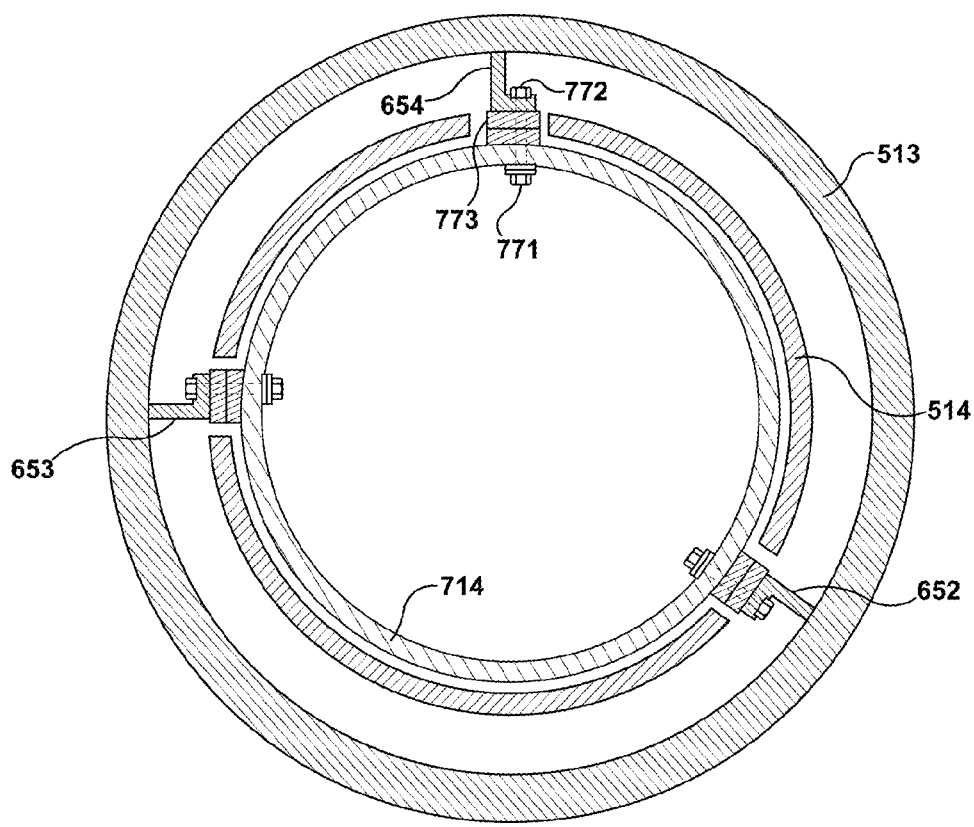
FIG. 7 illustrates a schematic view of the rotor after a replacement wye ring has been installed, according to an aspect of the present invention.

FIG. 7 illustrates a schematic view of the rotor 212 after a replacement wye ring 714 has been installed. In the past, there was no way to repair a cracked (or otherwise malfunctioning) wye ring 514 up-tower, or in-situ. The entire old generator had to be removed and a new generator was brought up to the nacelle and installed. As one might expect, this was a very expensive and time consuming operation, but the only known way to fix the generator. According to an aspect of the present invention, a new (or replacement) wye ring 714 is installed and placed radially inside the old wye ring 514.

To expose the connection lugs 651-653, the existing insulation must be removed from portions of the old wye ring 514. The replacement wye ring 714 will be fastened to the connection lugs. The fastening system may include a bolt 771, anti-rotation nut 772 and one or more shims 773. The replacement wye ring 714 may be made of copper or aluminum, and of sufficient diameter to nest just inside (but not in direct contact with) the previous wye ring 514. The fastening system may also include plated surfaces (e.g., silver plated) to increase conductivity. After installation of the replacement wye ring 714, the connection lugs 651-653, old exposed wye ring 514 portions and new wye ring 714 (as well as the fastening system) are encapsulated in dielectric (or insulating) material.

Figure 8:
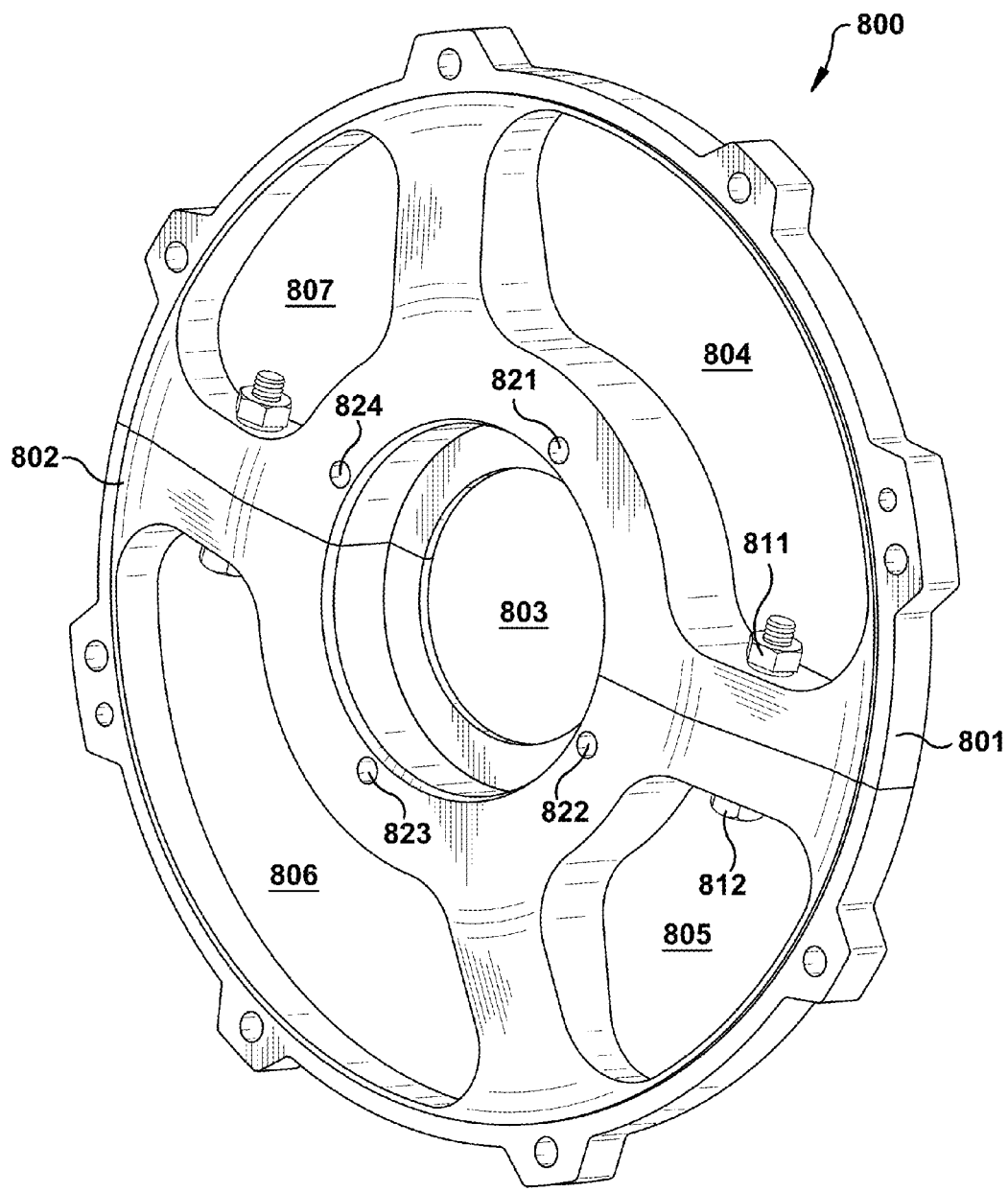
FIG. 8 illustrates a perspective front view of a temporary bearing shield, according to an aspect of the present invention.
Figure 9:
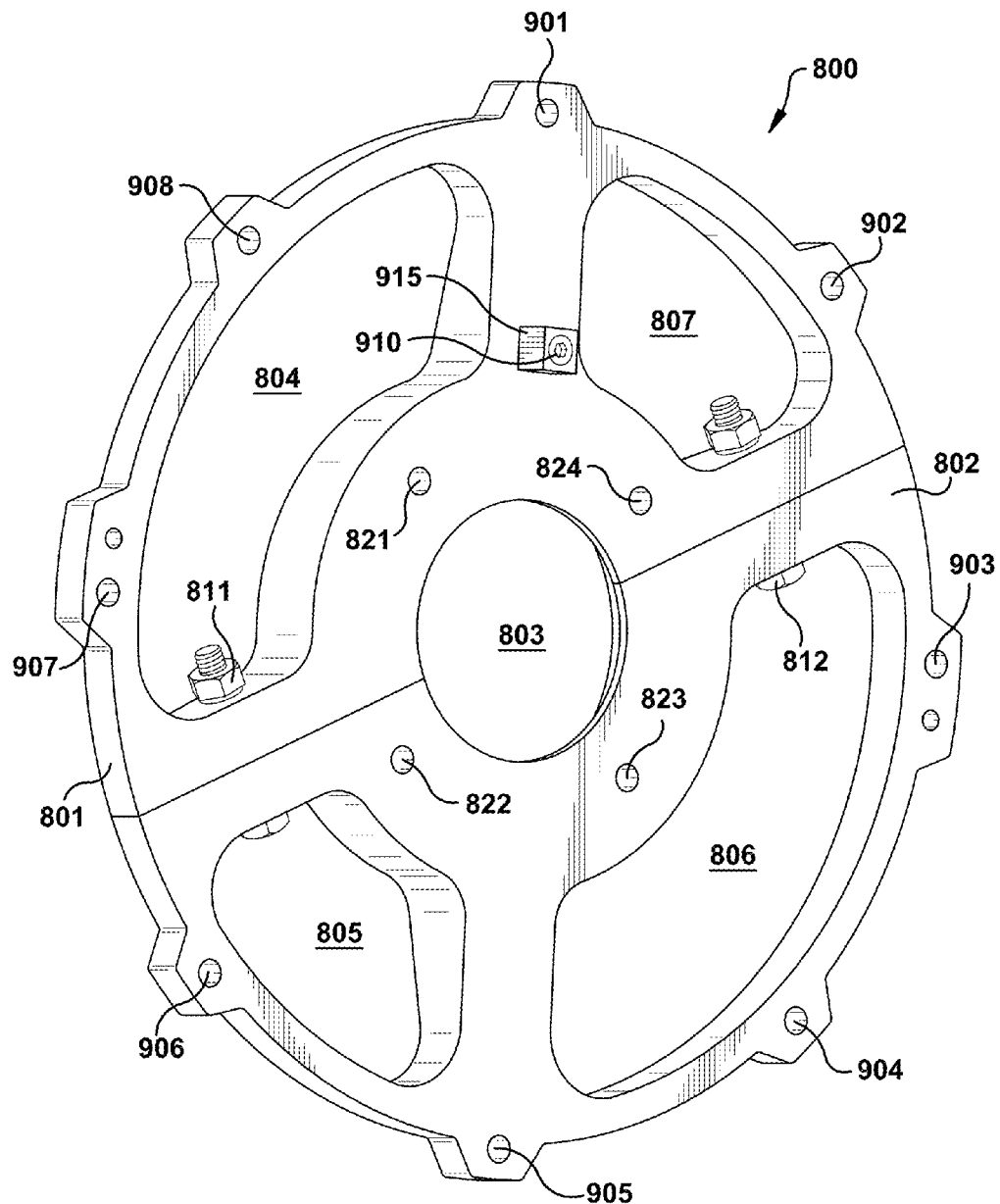
FIG. 9 illustrates a perspective back view of the temporary bearing shield, according to an aspect of the present invention.

The installation of this new hardware creates an imbalance problem for the rotor 212. It is highly likely that the rotor 212 will now be out of balance due to the addition of this new hardware, and some rotors have asymmetrically located connection lugs which further exacerbates the rotor balance problem. New generators built in a factory do not have this problem, as they are balanced during the building process. However, such a modification of a generator rotor in the field will almost invariably cause some rotor imbalance. As only the non-drive end 216 was modified, only the non-drive end 216 will most likely need to be balanced to bring the generator back into an acceptable balanced condition. The type of balancing performed on new generators is called two-plane balancing, since there are two bearing points at a considerable distance involved. The method, according to aspects of the present invention, will result in a dynamic balancing which will come close to the factory balancing but a residual and acceptable unbalance may remain. This could only be dealt with by performing a complete two-plane balancing, and to accomplish this the drive end 214 bearing shield (not shown) would have to be removed and replaced with a temporary one as shown in FIGS. 8 and 9. Typically, the factory (when building new generators) does not balance the rotor 212 with the slip-rings 234 or the entire slip ring assembly attached to the rotor 212. Therefore, the slip rings (or slip ring assembly) may be left off of the rotor during an in-situ rebalancing operation, if desired in specific applications. However, during a rebalancing operation it may be desirable to have other rotor attachments (e.g., the inner bearing cover, oil slinger, etc.) in place an attached to the rotor or rotor shaft. A system and method to accomplish such an in-situ (and up-tower) rotor rebalancing will now be described.

FIG. 8 illustrates a perspective front view of a bearing shield 800, according to an aspect of the present invention. The bearing shield 800 is a temporary bearing shield that is installed on the generator 200 and mimics the original bearing shield 230 dimensionally in such a way that all rotating parts of the rotor can be mounted as they are in a normal operating condition. The rotating parts may include the oil slinger, slip-ring or any other rotating part of the rotor that will affect balance thereof.

The temporary bearing shield 800 includes a first half 801 joined to a second half 802 by a nut 811 and bolt 812 arrangement. The two halves 801, 802 could also be joined by any other suitable joining method. The temporary bearing shield 800 includes a central aperture for supporting a non-drive portion of the rotor shaft to pass through. A plurality of windows 804, 805, 806, 807 are configured to permit operator access to the generator rotor fan 440, so that balancing weights may be attached thereto. The fan 440 is a good candidate for weight attachment as it provides many points with good surface area for weight attachment. The temporary bearing shield 800 also includes mounting means for mounting the NDE non-rotating parts of the generator rotor, and these mounting means may include threaded holes 821, 822, 823, 824 or other suitable brackets or hangers as provided on the original bearing shield 230. Non-rotating parts may include the inner bearing cover, inner bearing cap or other non-rotating parts.

FIG. 9 illustrates a perspective back view of the temporary bearing shield 800, according to an aspect of the present invention. The temporary bearing shield 800 includes a plurality of through holes 901-908 and for bolt passage and mounting of the shield 800 on the non-drive end 216 of generator 200. Through holes 821-824 may be used to attach the inner bearing cover 231 to the temporary bearing shield 800. During a rebalancing operation, the state of balance must be detected so the temporary bearing shield 800 also includes an accelerometer 910 that is configured to detect the state of rotor balance or imbalance. Accelerometer 910 may be a single axis type of accelerometer and can be magnetically attached to mount 915. The single axis type of accelerometer is preferably oriented radially towards the center of gyration to pick up the vibrations created by an unbalanced rotor condition. One accelerometer is shown, but it is to be understood multiple accelerometers could be used during a rotor rebalancing operation. As one example only, one accelerometer could be placed on the non-drive end 216 and another accelerometer could be placed on the drive end 214.

Figure 10:
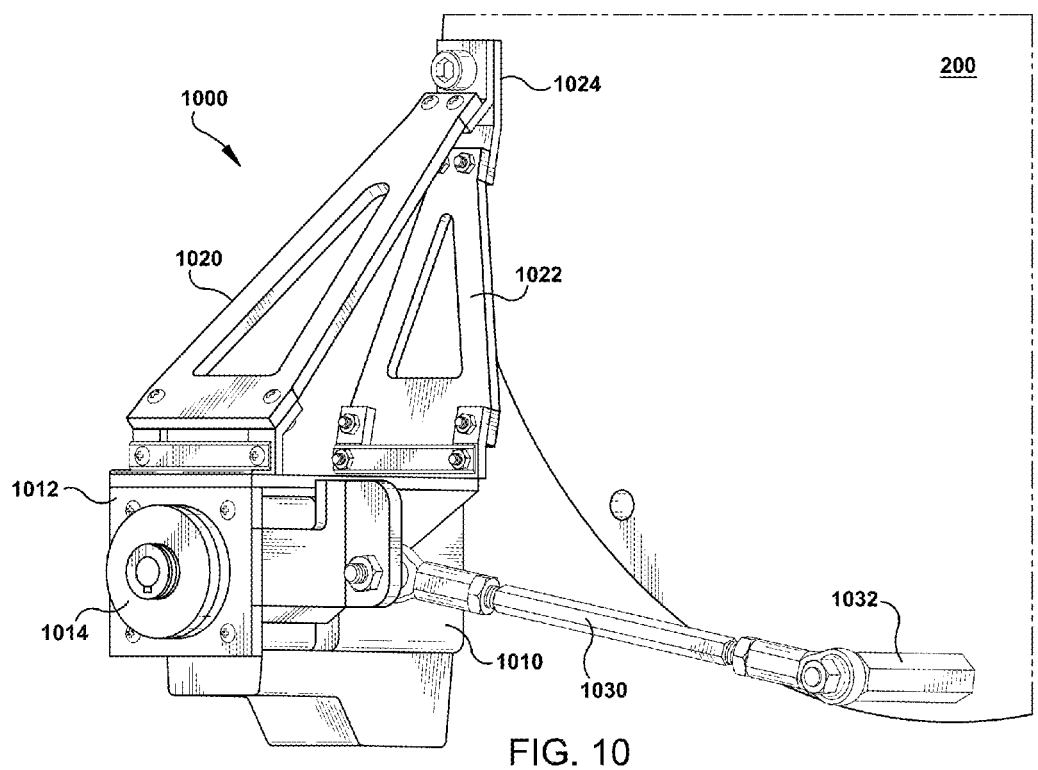
FIG. 10 illustrates a perspective view of a pony motor assembly, according to an aspect of the present invention.

FIG. 10 illustrates a perspective view of a pony motor assembly 1000, according to an aspect of the present invention. The pony motor assembly 1000 is configured for attachment to the drive end 214 of generator 200, and is also configured to rotate the generator rotor input shaft 220 during a rebalancing operation. The pony motor assembly 1000 includes a motor 1010 contained within motor housing 1012. The motor housing 1012 is attached to the generator 200 by a pony motor mount. The pony motor mount includes two brackets 1020, 1022 and a bracket mount 1024. The brackets 1020, 1022 are configured to be attached to generator 200 via bracket mount 1024. The motor 1010 drives a drive pulley 1014 that rotates a belt 1116 connected to the rotor input shaft 220. To provide tension for belt 116 a turnbuckle rod 1030 is configured for attaching the pony motor assembly 1000 to the generator 200. The turnbuckle rod 1030 may be attached to bolt 1032 threaded into generator 200, or any other suitable mounting location on the generator or other supporting structure. The turnbuckle rod 1030 can be rotated to increase or decrease tension on belt 1116.

The generator rotor 212 is very heavy (e.g., about 2 metric tons), and has its mass concentrated around a fairly large radius. This results in a very large inertia which needs to be overcome. If one were to employ a motor that would be started 'across the lines', that is by switching it on, the belt(s) might break or slip and burn up before the rotor 212 would come up to speed. A 'soft-start' motor controller would be very bulky and heavy plus the motor that goes along with such a controller would also be bulky and heavy, which makes for a difficult task transporting the motor and controller up the tower. As a more preferable option, a servo-drive motor 1010 is used which is controlled via a computer. A servo-drive motor can be started with tremendous torque at very low rpm and accelerated in a controlled way. For example, the motor 110 can have a very small speed increase rate in order to get the rotor 212 moving without slipping the belt 1116 or overloading the drive elements or motor 1010.

Figure 11:
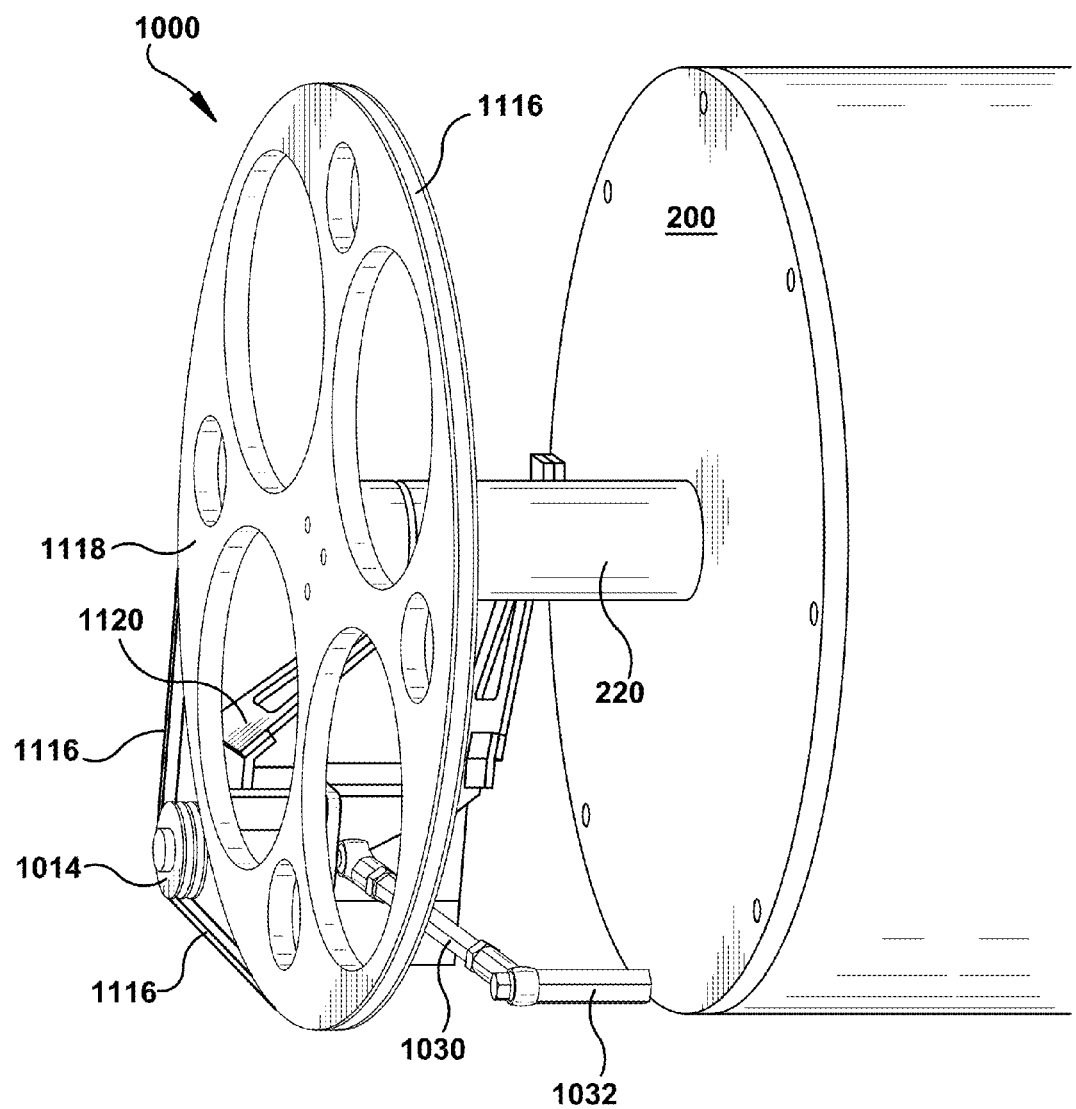
FIG. 11 illustrates a perspective view of the pony motor assembly connected to the generator rotor input shaft, according to an aspect of the present invention.

FIG. 11 illustrates a perspective view of the pony motor assembly 1000 connected to the generator rotor input shaft, according to an aspect of the present invention. The pulley 1118 may be connected to the rotor input shaft 220 via any suitable mounting means (e.g., a bolted flange connection, etc.). To rotate the generator rotor 212, the motor is energized to rotate the drive pulley 1014, this in turn drives belt 1116 that rotates pulley 1116 and rotor input shaft 220. As one example only, motor 1010 may drive rotor 212 at about 200 rpm to about 400 rpm during a rebalancing operation.

Figure 12:
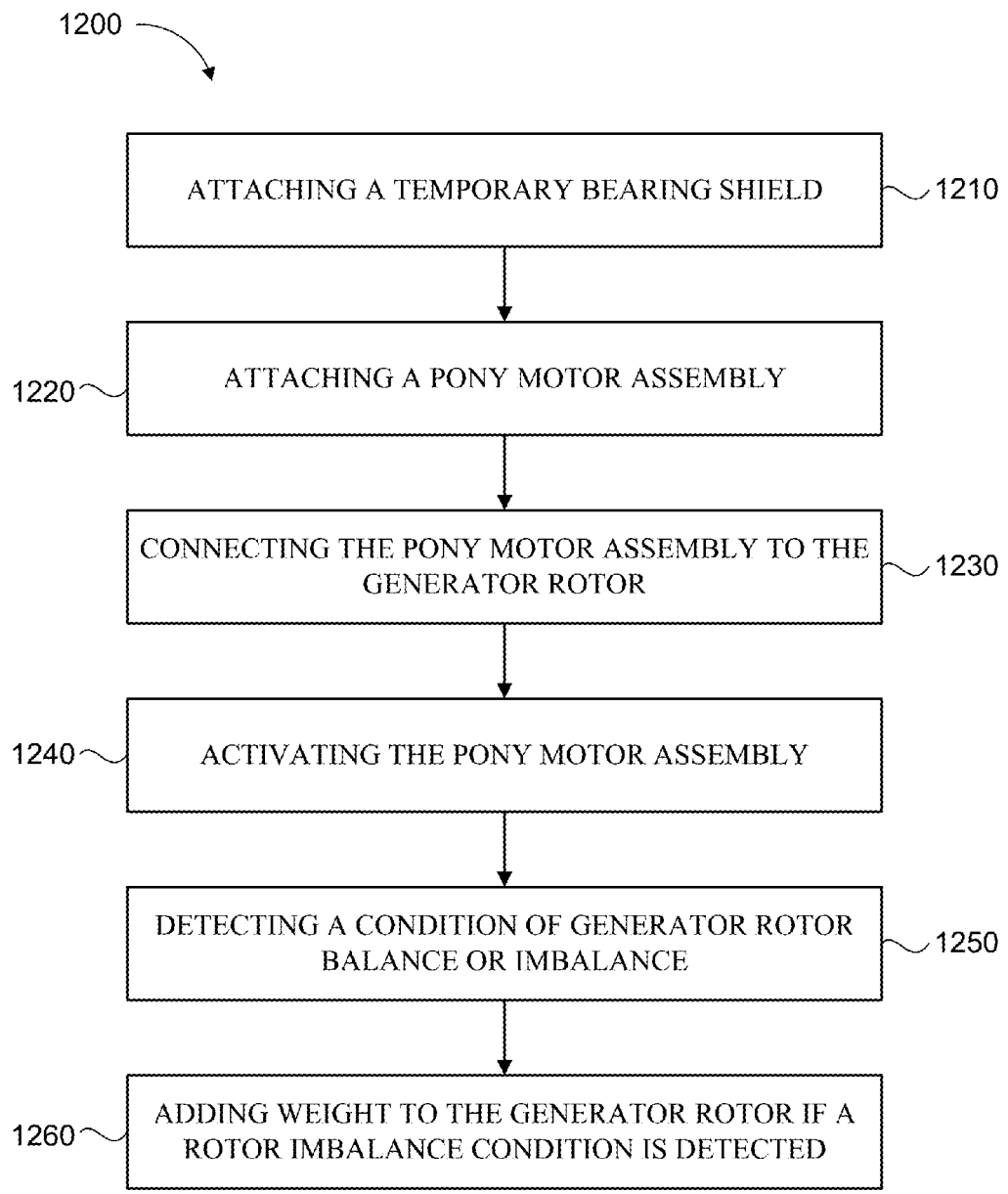
FIG. 12 illustrates a flow chart of a method for rebalancing a generator rotor in-situ, according to an aspect of the present invention.

FIG. 12 illustrates a flow chart of a method 1200 for balancing (or rebalancing) a generator rotor 212 in-situ. This method can be performed while the generator 200 is located inside of a nacelle 106 on top of a wind turbine tower 102. The method includes a step 1210 of attaching a temporary bearing shield 800 to a non-drive end 216 of a generator 200. This step may also include attaching rotating parts of the generator rotor to the generator rotor and attaching non-rotating parts to the temporary bearing shield. An attaching step 1220 attaches a pony motor assembly 1000 to a drive-end 214 of the generator 200. A connecting step 1230 connects the pony motor assembly 1000 to the generator rotor input shaft 220 (and therefore rotor 212). This step may also include attaching a pulley 1118 to the rotor 212 (or input shaft 220) and connecting the pulley 1118 to the pony motor assembly 1000 via belt 1116. The belt can be tensioned by attaching a turnbuckle rod 1030 to the generator and the pony motor assembly 1000. The turnbuckle rod can be rotated to increase or decrease the length thereof, and thereby increasing or decreasing the amount of tension on belt 1118. To test the balance of the rotor and activating step 1240 activates the pony motor assembly (i.e., motor 1010) to rotate the generator rotor 212, and a detecting step 1250 detects a condition of generator rotor balance or imbalance. The detecting step 1250 may also include receiving data from one or more accelerometers (e.g., accelerometer 910) that output data used to indicate the condition of the rotor balance/imbalance. A weight addition step 1260 adds weight to the generator rotor 212 if a rotor imbalance condition is detected to correct the rotor imbalance. The weight addition step may include adding weight to specific portions of fan 440 (or other parts of rotor 212) to correct rotor balance.

Figure 13:
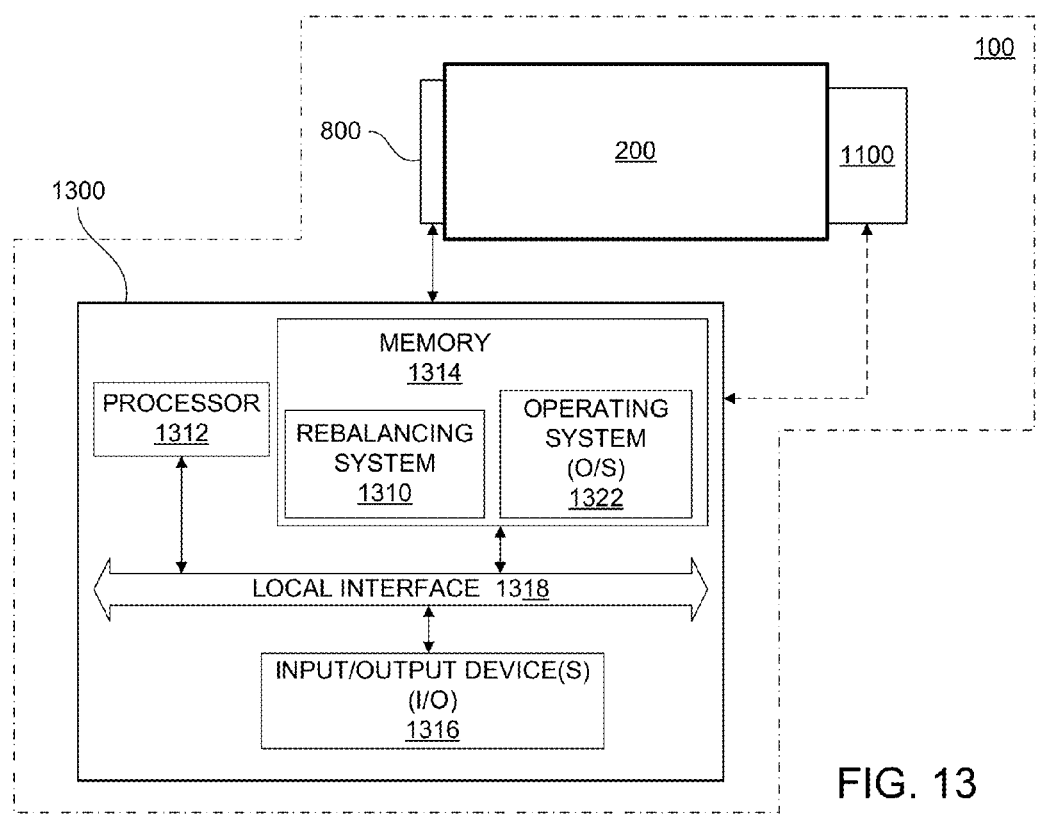
FIG. 13 illustrates a schematic view of the system for in-situ rebalancing the generator rotor, according to an aspect of the present invention.

FIG. 13 illustrates a schematic view of the system for rebalancing the generator rotor while the generator 200 is within wind turbine 100. The system includes temporary bearing shield 800, pony motor assembly 1100, both of which are shown attached to generator 200, and computer 1300. The rebalancing system 1310 of the invention can be implemented in software (e.g., firmware), hardware, or a combination thereof. In the currently contemplated best mode, the rebalancing system 1310 is implemented in software, as an executable program, and is executed by a special or general purpose digital computer, such as a personal computer (PC; IBM-compatible, Apple-compatible, or otherwise), workstation, minicomputer, or mainframe computer. An example of a general purpose computer that can implement the rebalancing system 1310 of the present invention is shown in FIG. 13.

Generally, in terms of hardware architecture, as shown in FIG. 13, the computer 1300 includes a processor 1312, memory 1314, and one or more input and/or output (I/O) devices 1316 (or peripherals) that are communicatively coupled via a local interface 1318. The local interface 1318 can be, for example but not limited to, one or more buses or other wired or wireless connections, as is known in the art. The local interface 1318 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 1312 is a hardware device for executing software, particularly that stored in memory 1314. The processor 1312 can be any custom made or commercially available processor, a central processing unit (CPU), an auxiliary processor among several processors associated with the computer 1300, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard Company, an 80×86 or Pentium series microprocessor from Intel Corporation, a PowerPC microprocessor from IBM, a Sparc microprocessor from Sun Microsystems, Inc, or a 68xxx series microprocessor from Motorola Corporation.

The memory 1314 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 1314 may incorporate electronic, magnetic, optical, and/or other types of storage media. Note that the memory 1314 can have a distributed architecture, where various components are situated remote from one another, but can be accessed by the processor 12.

The software in memory 1314 may include one or more separate programs, each of which comprises an ordered listing of executable instructions for implementing logical functions. In the example of FIG. 1, the software in the memory 1314 includes the rebalancing system 1310 in accordance with the present invention and a suitable operating system (O/S) 1322. A nonexhaustive list of examples of suitable commercially available operating systems 1322 is as follows: (a) a Windows operating system available from Microsoft Corporation; (b) a Netware operating system available from Novell, Inc.; (c) a Macintosh operating system available from Apple Computer, Inc.; (e) a UNIX operating system, which is available for purchase from many vendors, such as the Hewlett-Packard Company, Sun Microsystems, Inc., and AT&T Corporation; (d) a LINUX operating system, which is freeware that is readily available on the Internet; (e) a run time Vxworks operating system from WindRiver Systems, Inc.; or (f) an appliance-based operating system, such as that implemented in handheld computers or personal data assistants (PDAs) (e.g., PalmOS available from Palm Computing, Inc., and Windows CE available from Microsoft Corporation). The operating system 1322 essentially controls the execution of other computer programs, such as the rebalancing system 1310, and provides scheduling, input-output control, file and data management, memory management, and communication control and related services.

The rebalancing system 1310 is a source program, executable program (object code), script, or any other entity comprising a set of instructions to be performed. When a source program, then the program needs to be translated via a compiler, assembler, interpreter, or the like, which may or may not be included within the memory 1314, so as to operate properly in connection with the O/S 1322. Furthermore, the rebalancing system 1310 can be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada. In the currently contemplated best mode of practicing the invention, the rebalancing system 1310 is connected to the accelerometers 911-914 and data received from the accelerometers is used to indicate the state of balance/imbalance of rotor 212 and if the rotor is imbalanced, then where to place balancing weights and how much weight to place at each designated location on rotor 212 (or fan 440 or any other suitable rotor location).

The I/O devices 1316 may include input devices, for example but not limited to, an accelerometers 910, a keyboard, mouse, scanner, microphone, etc. Furthermore, the I/O devices 1316 may also include output devices, for example but not limited to, a printer, display, etc. Finally, the I/O devices 1316 may further include devices that communicate both inputs and outputs, for instance but not limited to, a modulator/demodulator (modem; for accessing another device, system, or network), a radio frequency (RF) or other transceiver, a telephonic interface, a bridge, a router, etc.

If the computer 1300 is a PC, workstation, laptop, smartphone, tablet or the like, the software in the memory 1314 may further include a basic input output system (BIOS) (omitted for simplicity). The BIOS is a set of essential software routines that initialize and test hardware at startup, start the O/S 1322, and support the transfer of data among the hardware devices. The BIOS is stored in ROM so that the BIOS can be executed when the computer 1300 is activated. When the computer 1300 is in operation, the processor 1312 is configured to execute software stored within the memory 1314, to communicate data to and from the memory 1314, and to generally control operations of the computer 1300 pursuant to the software. The rebalancing system 1310 and the O/S 1322, in whole or in part, but typically the latter, are read by the processor 1312, perhaps buffered within the processor 1312, and then executed.

When the rebalancing system 1310 is implemented in software, as is shown in FIG. 31, it should be noted that the rebalancing system 1310 can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The rebalancing system 1310 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the rebalancing system 1310 is implemented in hardware, the rebalancing system 1310 can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 14:
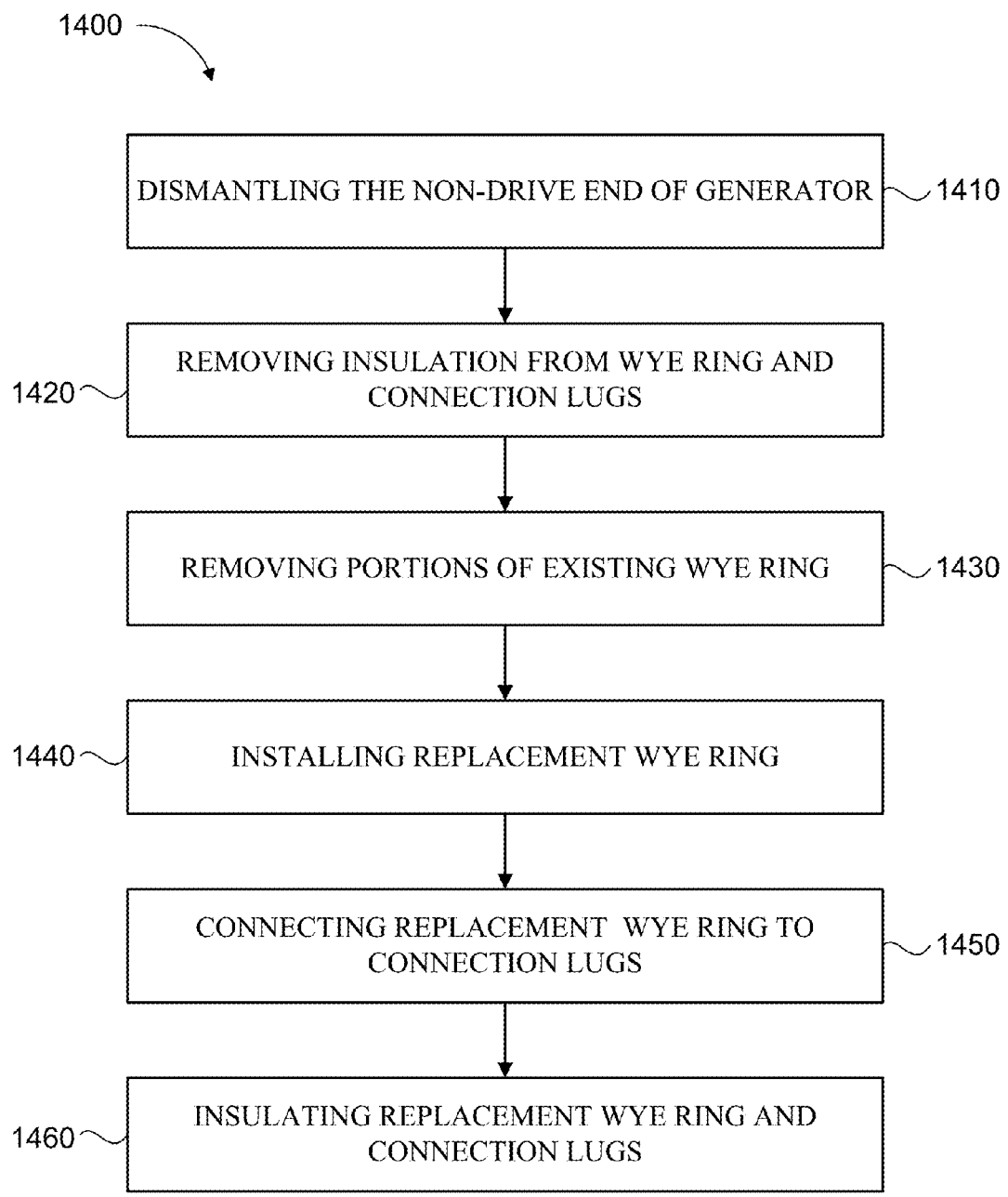
FIG. 14 illustrates a flow chart of a method for repairing a rotor of a generator in a wind turbine, according to an aspect of the present invention.

FIG. 14 illustrates a flow chart of a method 1400 for repairing (or servicing) a rotor 212 of a generator 200 in a wind turbine 100. The method 1400 may be performed in-situ, or while the generator 200 is housed within the nacelle 106 of the wind turbine 100. The method 1400 includes a step 1410 of dismantling a non-drive end 216 of the generator 200. See also FIGS. 3-5. This step may also include dismantling the non-drive end 216 to expose the rotor 212, existing wye ring 514 and existing connection lugs 651, 652, 653. Step 1420 removes insulation from portions of the existing wye ring 514 and the existing connection lugs 651, 652, 653. This step may also include removing blocking and support material from portions of the existing wye ring 514 and the existing connection lugs 651, 652, 653. Step 1430 removes portions of the existing wye ring 514 near the existing connection lugs 651, 652, 653. This step may also include electrically disconnecting the existing wye ring 514 from the rotor 212 or rotor end windings 513.

Figure 15:
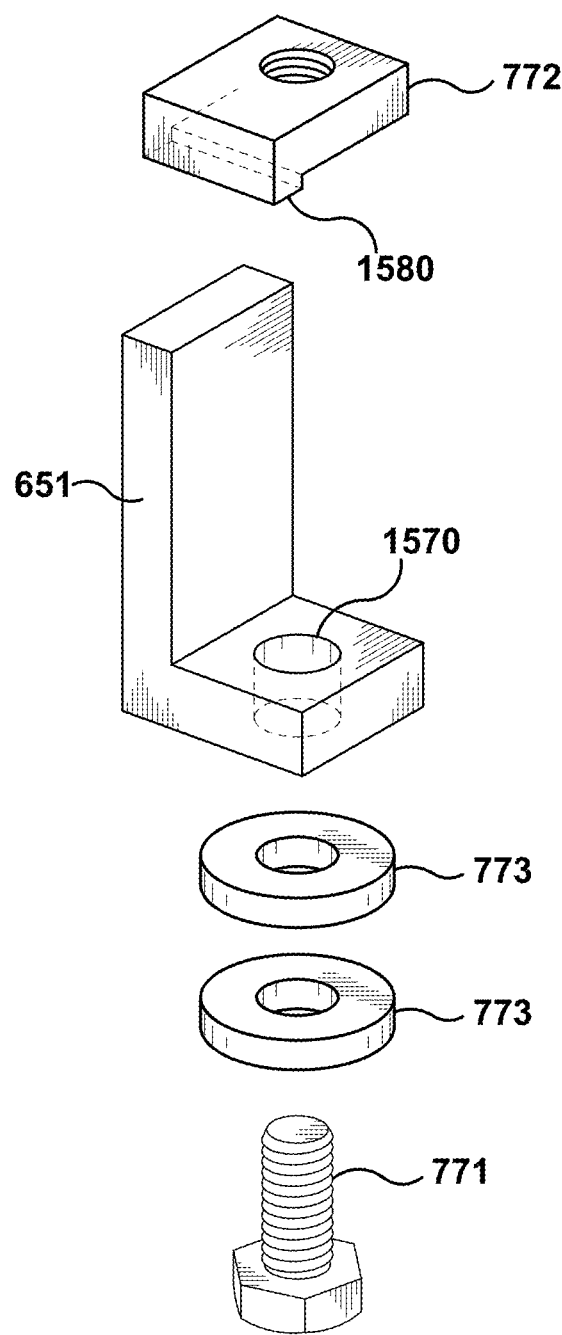
FIG. 15 is an exploded and perspective view of the connection arrangement used to connect the replacement wye ring to the connection lug, according to an aspect of the present invention.

Step 1440 installs the replacement wye ring 714 in the generator 200. See FIG. 7. This step may also include positioning the replacement wye ring 714 radially inside the existing wye ring 514 and co-axial with the rotor 212 or central shaft of the rotor. Step 1450 connects the replacement wye ring to the existing connection lugs 651, 652, 653. This step may include drilling a through hole 1570 into each of the existing connection lugs and mechanically fastening the replacement wye ring 714 to each of the existing connection lugs with a bolt 771, a nut 772 (which may be an anti-rotation nut) and one or more shims 773. FIG. 15 is an exploded and perspective view of the connection arrangement used to connect the replacement wye ring 714 to the connection lug 651. Nut 772 includes an overhang 1580 used to prevent the nut 772 from turning when placed on the connection lug 651.

Step 1460 insulates the replacement wye ring 714 and the existing connection lugs 651, 652, 653. Method 1400 may also include the steps of partially reassembling the generator, attaching a temporary bearing shield to the non-drive end of the generator, detecting a condition of rotor balance or imbalance, and adding weight to the rotor if a rotor imbalance condition is detected to correct the rotor imbalance.

The method and system of the present invention demonstrates substantially improved results that were unexpected, because a generator having a defective wye ring can now be repaired in-situ and up-tower in a wind turbine. Previously, the only known solution was to remove the entire generator and install a new generator (a costly and time consuming endeavor). The method and system of the present invention enables the wind turbine to be restored to operating condition much faster and at much less expense.

Figure 16:
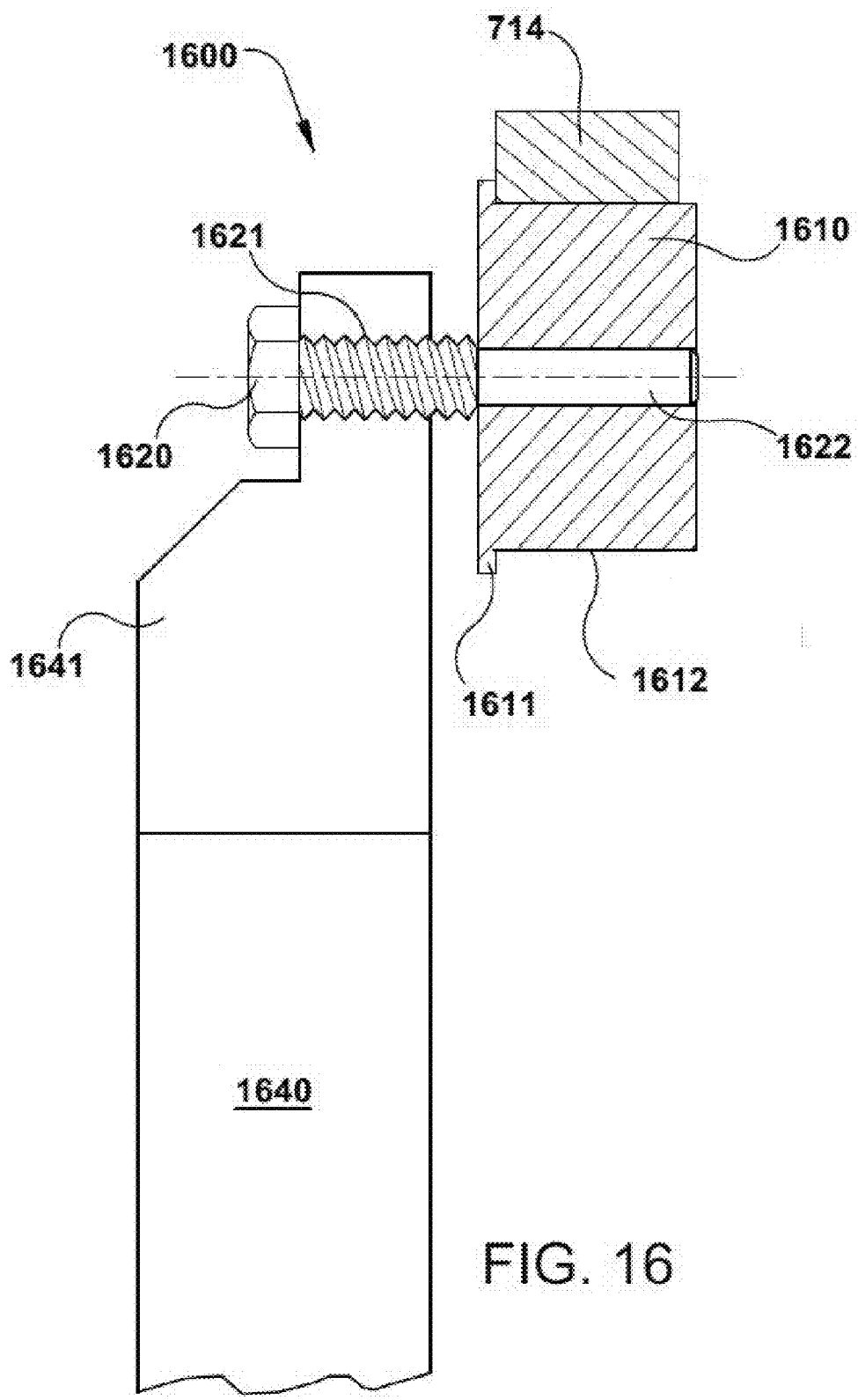
FIG. 16 illustrates a cross-sectional view of a wye ring centering system, according to an aspect of the present invention.

FIG. 16 illustrates a cross-sectional view of a wye ring centering system 1600, according to an aspect of the present invention. A plurality of rollers 1610 are configured for contacting a wye ring 714. Each roller 1610 may be configured to fit over a non-threaded portion 1622 on the shaft of mounting fasteners 1620. For example, each fastener 1620 may have a threaded portion 1621 that interacts with the fan hub 1640 and a non-threaded portion 1622 for interacting with the rollers 1610, and each roller 1610 is mounted on the non-threaded portion 1622 of each mounting fastener 1620. The rollers 1610 include a ridge 1611 located adjacent to a valley or land 1612, and the valley/land 1612 has a width configured to be approximately the same width as the wye ring 714. The ridge 1611 is configured for temporarily retaining the wye ring 714 on the rollers 1610. The opposing end of roller 1610 does not contain a ridge 1611 to facilitate placement of the wye ring 714 on the rollers, and also to facilitate removal of the wye ring from the rollers 1610. The fan hub 1640 is attached to a rotor shaft 1720 of a generator 200, and the shaft 1720 is part of the rotor 212.

A plurality of mounting fasteners 1620 are configured for supporting the rollers 1610, and each of the mounting fasteners 1620 is configured to pass through a hole in fan hub 1640, and specifically through a hole in fan hub leg 1641. The fastener 1620 may be a bolt with a shaft having both smooth and threaded portions, or any other suitable fastener. The fan hub 1640 is typically a highly accurately machined part with close tolerances, as the fan 440 must be attached to the fan hub 1640. The fan hub legs 1641 are also fabricated with close tolerances, and can be used as a reference point for centering the replacement wye ring 714.

Figure 19:
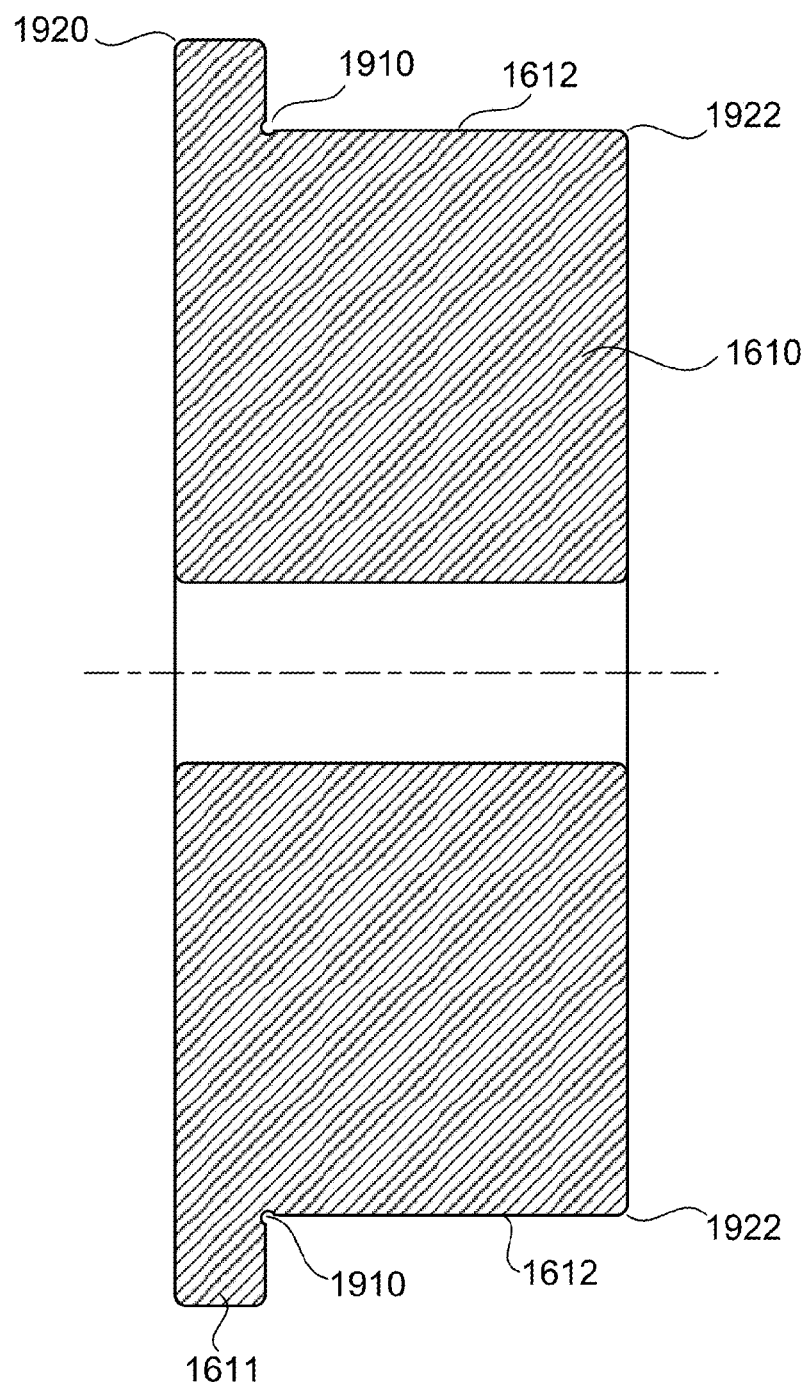
FIG. 19 illustrates a cross-sectional view of a roller according to an aspect of the present invention

FIG. 19 illustrates a cross-sectional view of a roller 1610 according to an aspect of the present invention. The roller 1610 includes a ridge 1611 and a valley or land 1612. During use the rollers may be subject to stress imposed by the wye ring, so it may be beneficial to reduce stress where the ridge 1611 meets the valley/land 1612. At the intersection between the ridge 1611 and the valley/land 1612 an undercut 1910 is provided to reduce stress in this area. The undercut 1910 may be machined in the roller and have any suitable radius and dimension as desired in the specific application. To facilitate use of the rollers 1610 with the wye ring, the rollers may include rounded or chamfered corners or edges 1920, 1922. For example, rounded or chamfered corner 1922 may facilitate placement of the wye ring onto the rollers 1610. The rounded or chamfered corners or edges 1920, 1922 will also facilitate extraction of the rollers from the wye ring after installation is complete.

Figure 17:
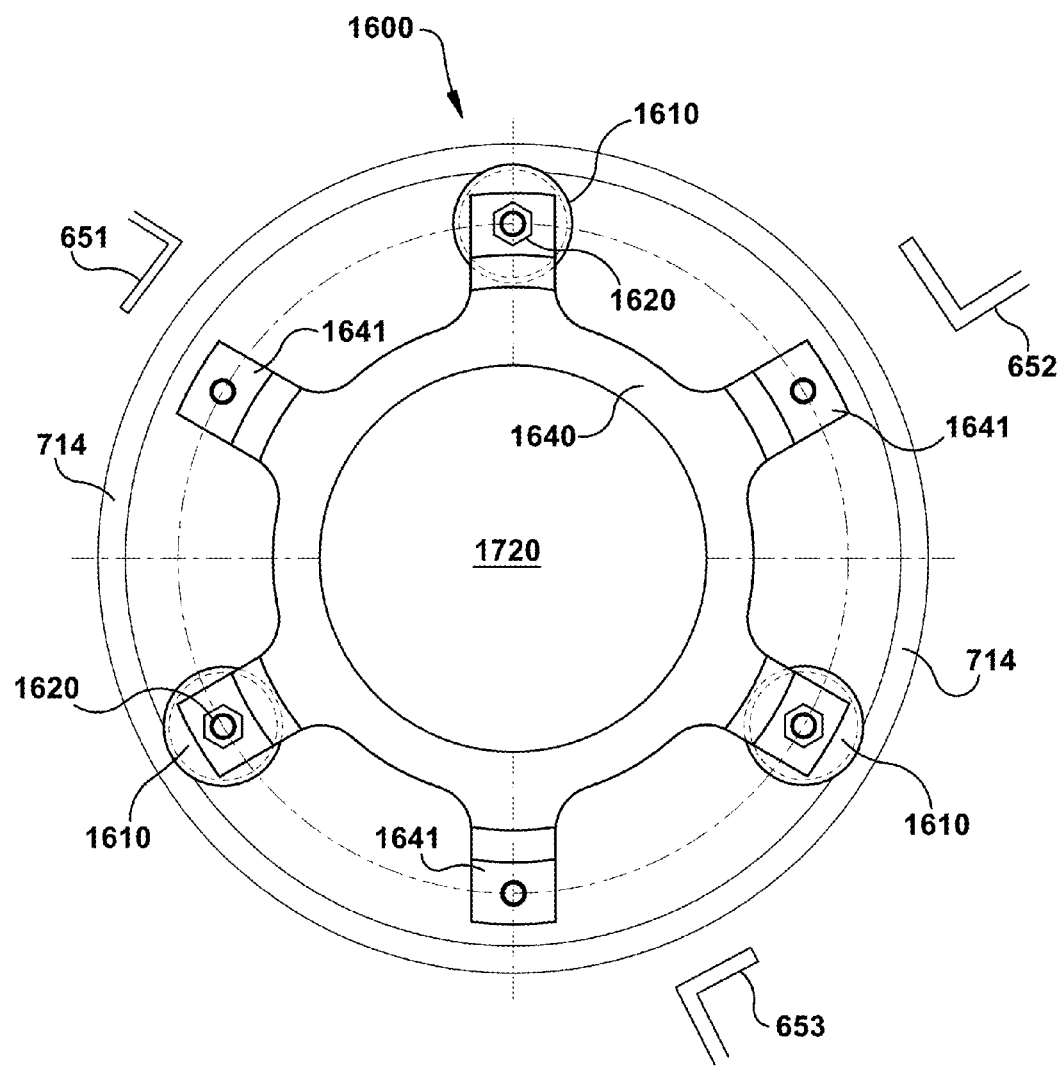
FIG. 17 illustrates an end view of the wye ring centering system installed on the fan hub, according to an aspect of the present invention.

FIG. 17 illustrates an end view of the wye ring centering system 1600 installed on the fan hub 1640, according to an aspect of the present invention. The plurality of rollers 1610 and the plurality of mounting fasteners 1620 are distributed at substantially equal intervals around the fan hub 1640, and the replacement wye ring 714 is placed over the plurality of rollers 1610 to center the wye ring 714 around the shaft 1720. In this example, the fan hub 1640 includes six fan hub legs 1641, and each leg is spaced apart from the other legs by about 60 degrees. In this configuration, each roller 1610 can be attached to every other fan hub leg, resulting in a spacing of about 120 degrees between each roller. However, it is to be understood that the fan hub 1640 could have any number of fan hub legs, as desired in the specific application, and the rollers 1610 could be spaced at substantially equal intervals or any interval that permits the replacement wye ring 714 to be centered around shaft 1720.

The connection lugs 651-653 are not always uniformly spaced from the shaft 1720, so one cannot use the connection lugs 651-653 as a reference for centering the replacement wye ring 714. For example, if spacers between each connection lug 651, 652, 653 and the wye ring 714 were set at the same thickness, it would be very likely that the wye ring 714 would not be centered about or concentric with the shaft 1720. This non-concentricity causes the replacement wye-ring 714 to wobble during rotor rotation, and imparts undesired stress and vibration on the connection lugs 651-653. After prolonged exposure to stress or vibration, the connection lugs 651-653 could break or crack. It is highly desirable to minimize this off-center induced stress or vibration caused by the replacement wye ring, so accurate centering of the replacement wye ring 714 is important. The wye ring centering system 1600 enables the replacement wye ring 714 to be centered around shaft 1720, and the wye ring centering system 1600 may be installed on a generator 200 in-situ and up-tower in wind turbine 100.

Figure 18:
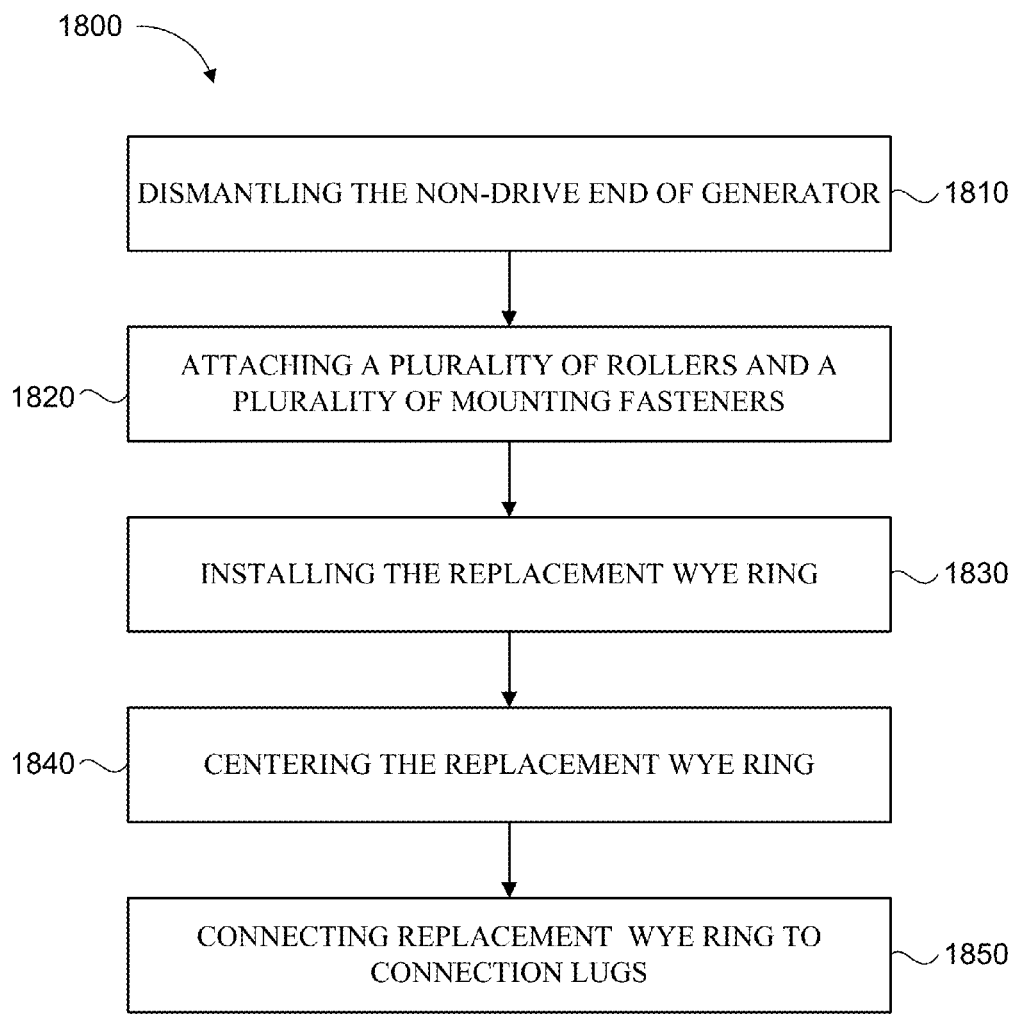
FIG. 18 illustrates a flowchart for a method of centering the replacement wye ring around a shaft, according to an aspect of the present invention.

FIG. 18 illustrates a flowchart for a method 1800 of centering a replacement wye ring 714 around a shaft 1720, according to an aspect of the present invention. The method includes a step 1810 of dismantling a non-drive end 216 of a generator 200 to gain access to an existing wye ring 514. Step 1820 attaches a plurality of rollers 1610 and a plurality of mounting fasteners 1620 to a rotor 212. The plurality of rollers 1610 are configured for contacting the replacement wye ring 714 and the plurality of mounting fasteners 1620 are configured for supporting the plurality of rollers 1620. Step 1830 installs the replacement wye ring in the generator, and step 1840 centers the replacement wye ring 714 around the shaft 1720 by placing the replacement wye ring 714 over the plurality of rollers 1610. Step 1850 connects the replacement wye ring 714 to a plurality of connection lugs 651, 652, 653. The replacement wye ring 714 may be connected to each of the plurality of connection lugs 651-653 with a bolt, a nut and one or more shims, as described previously. The method 1800 may be performed on the generator 200 in-situ or up-tower.

Method 1800 may also include the steps of distributing the plurality of rollers 1610 and the plurality of mounting fasteners 1620 at substantially equal intervals around the shaft 1720 or fan hub 1640. The plurality of rollers 1610 and the plurality of mounting fasteners 1620 may be attached to the fan hub 1640, which is attached to the shaft 1720. The method 1800 may also include the step of electrically disconnecting the existing wye ring 514 from the rotor 212.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A wye ring centering system, the system comprising:
   a plurality of rollers configured for contacting a wye ring;
   a plurality of mounting fasteners configured for supporting the plurality of rollers, each of the mounting fasteners configured to pass through a fan hub;
   wherein, the plurality of rollers and the plurality of mounting fasteners are distributed at substantially equal intervals around the fan hub, and the wye ring is placed over the plurality of rollers to center the wye ring around a shaft, wherein the wye ring centering system is installed on a wind turbine generator in-situ.

2. The wye ring centering system of claim 1, wherein each of the plurality of rollers are attached to fan hub legs and spaced about 120 degrees apart, each of the plurality of rollers are mounted on a non-threaded portion of each of the plurality of mounting fasteners.

3. The wye ring centering system of claim 1, each of the plurality of rollers further comprising:
   a ridge located adjacent to a valley or a land, the valley or the land having a width configured to be approximately the same width as the wye ring, the ridge configured for temporarily retaining the wye ring on the plurality of rollers.

4. The wye ring centering system of claim 3, each of the plurality of rollers further comprising:
   an undercut formed at the intersection of the ridge and the valley or the land, the undercut configured to reduce stress at the intersection of the ridge and the valley or land.

5. The wye ring centering system of claim 1, wherein the fan hub is attached to a rotor of a generator, and the shaft is part of the rotor.

6. A wye ring centering system for a rotor of a generator located in a wind turbine, the system comprising:
   a plurality of rollers configured for contacting a wye ring;
   a plurality of mounting fasteners configured for supporting the plurality of rollers, each of the mounting fasteners configured to pass through a fan hub;
   a replacement wye ring configured to replace an existing wye ring serving as a floating neutral connection in the rotor, wherein the replacement wye ring is positioned radially inside the existing wye ring and co-axial with the rotor;
   a fastening system configured for mechanically and electrically connecting the replacement wye ring to a plurality of connection lugs, the plurality of connection lugs electrically connected to windings of the rotor; and
   wherein, the plurality of rollers and the plurality of mounting fasteners are distributed at substantially equal intervals around the fan hub, and the wye ring is placed over the plurality of rollers to center the wye ring around a shaft, and wherein the replacement wye ring replaces the floating neutral connection of the existing wye ring.

7. The wye ring centering system of claim 6, wherein the wye ring centering system is installed on the generator in-situ, and the generator is located in a nacelle of the wind turbine.

8. The wye ring centering system of claim 7, the fastening system further comprising:
   a bolt, an anti-rotation nut and one or more shims, and
   wherein the anti-rotation nut includes an overhang configured to prevent the anti-rotation nut from turning when placed on one of the plurality of connection lugs, the fastening system comprises plated load bearing surfaces that increase electrical conductivity.

9. The wye ring centering system of claim 8, wherein each of the plurality of rollers are attached to fan hub legs and are spaced about 120 degrees apart.

10. The wye ring centering system of claim 9, wherein each of the plurality of rollers are mounted on a non-threaded portion of each of the plurality of mounting fasteners.

11. The wye ring centering system of claim 10, each of the plurality of rollers further comprising:
   a ridge located adjacent to a valley or a land, the valley or the land having a width configured to be approximately the same width as the wye ring, the ridge configured for temporarily retaining the wye ring on the plurality of rollers.

12. The wye ring centering system of claim 11, each of the plurality of rollers further comprising:
   an undercut formed at the intersection of the ridge and the valley or the land, the undercut configured to reduce stress where the ridge meets the valley or the land, and wherein each of the plurality of rollers has rounded or chamfered corners.

13. The wye ring centering system of claim 12, wherein the fan hub is attached to the rotor of the generator, and the shaft is part of the rotor.

14. A wye ring centering system for a rotor of a generator located in a wind turbine, the system comprising:
- a plurality of rollers configured for contacting a wye ring;
- a plurality of mounting fasteners configured for supporting the plurality of rollers, each of the mounting fasteners configured to pass through a fan hub;
- a replacement wye ring configured to replace an existing wye ring serving as a floating neutral connection in the rotor, wherein the replacement wye ring is positioned radially inside the existing wye ring and co-axial with the rotor;
- a fastening system configured for mechanically and electrically connecting the replacement wye ring to a plurality of connection lugs, the plurality of connection lugs electrically connected to windings of the rotor; and
- wherein, the plurality of rollers and the plurality of mounting fasteners are distributed at substantially equal intervals around the fan hub, and the wye ring is placed over the plurality of rollers to center the wye ring around a shaft, wherein the replacement wye ring replaces the floating neutral connection of the existing wye ring, and the wye ring centering system is installed on the generator in-situ, and the generator is located in a nacelle of the wind turbine.

15. The wye ring centering system of claim 14, each of the plurality of rollers further comprising:
- a ridge located adjacent to a valley or a land, the valley or the land having a width configured to be approximately the same width as the wye ring, the ridge configured for temporarily retaining the wye ring on the plurality of rollers.

16. The wye ring centering system of claim 15, each of the plurality of rollers further comprising:
- an undercut formed at the intersection of the ridge and the valley or the land, the undercut configured to reduce stress where the ridge meets the valley or the land.

17. The wye ring centering system of claim 16, wherein each of the plurality of rollers has a rounded or chamfered corner.

18. The wye ring centering system of claim 17, the fastening system further comprising:
- a bolt, an anti-rotation nut and one or more shims, and
- wherein the anti-rotation nut includes an overhang configured to prevent the anti-rotation nut from turning when placed on one of the plurality of connection lugs, wherein the fastening system comprises plated load bearing surfaces that increase electrical conductivity.

19. The wye ring centering system of claim 18, wherein each of the plurality of rollers are attached to fan hub legs and spaced about 120 degrees apart, and each of the plurality of rollers are mounted on a non-threaded portion of each of the plurality of mounting fasteners, and wherein the fan hub is attached to the rotor of the generator, and the shaft is part of the rotor.

* * * * *